United States Patent [19]
Karlsson et al.

[11] Patent Number: 5,409,269
[45] Date of Patent: Apr. 25, 1995

[54] BALL JOINT MECHANISM

[75] Inventors: Lars G. Karlsson, Svedala; Robert M. Houltz, Lund; Lars M. Sjöbeck, Lund; Nils I. Troedsson, Lund, all of Sweden

[73] Assignee: AB Ph. Nederman & Co., Helsingborg, Sweden

[21] Appl. No.: 61,991

[22] Filed: May 17, 1993

[30] Foreign Application Priority Data

May 21, 1992 [SE] Sweden ................. 9201593

[51] Int. Cl.⁶ .............................. F16L 27/04
[52] U.S. Cl. ................... 285/166; 285/184; 285/269
[58] Field of Search ............... 285/166, 167, 184, 268, 285/269

[56] References Cited

U.S. PATENT DOCUMENTS

| 386,547 | 7/1888 | Martin | 285/269 X |
| 508,006 | 11/1893 | Filstrup | 285/166 |
| 809,977 | 1/1906 | O'Brien | 285/166 X |
| 1,827,432 | 10/1931 | Hundemer | |
| 2,456,182 | 12/1948 | Goble | 285/166 |
| 2,531,020 | 11/1950 | Bard | 285/95 |
| 4,540,202 | 9/1985 | Amphoux et al. | 285/184 |
| 4,860,644 | 6/1989 | Kohl et al. | 285/184 X |

FOREIGN PATENT DOCUMENTS

| 699369 | 2/1931 | France . |
| 787353 | 9/1935 | France . |
| 187925 | 5/1906 | Germany . |
| 512374 | 10/1930 | Germany . |
| 1425478 | 2/1969 | Germany . |
| 3727915 | 3/1989 | Germany . |

Primary Examiner—Dave W. Arola
Attorney, Agent, or Firm—Foley & Lardner

[57] ABSTRACT

The present invention relates to a ball joint mechanism which is adapted to permit setting of two members relative to each other, said members forming part of a settable device for gas transport, whereby one of said members preferably consists of a gas conduit and the other member preferably of a nozzle which is connected with said gas conduit and settable in various positions in relation thereto. In order to permit, at a ball joint mechanism of this type, quick setting by hand of the spring forces without any operations in the ball joint mechanism itself, said mechanism (11) comprises two pivotally mounted balls (13, 14) of which one ball (13) is connected with one member (6 and/or 9) of the settable device (1) and the other ball (14) with the other member (10) of said settable device, whereby the balls (13, 14) cooperate with friction elements (17, 18 and/or 19, 20) for obtaining the required frictional resistance when said balls pivot, and whereby at least one spring element (21) is provided to compensate for eventual wear of said friction elements (17, 18 and/or 19, 20) and/or of surfaces cooperating therewith of the balls (13, 14); and the balls (13, 14) are provided in a joint housing (12) comprising two members (22, 23) which can be set relative to each other in such a way that the spring forces of the spring element can be changed by changing the mutual position of said members (22, 23) of the joint housing (12).

12 Claims, 4 Drawing Sheets

BALL JOINT MECHANISM

BACKGROUND OF THE INVENTION

The present invention relates to a ball joint mechanism which is adapted to permit setting of two members relative to each other, said members forming part of a settable device for gas transport, whereby one of said members preferably consists of a gas conduit and the other member preferably of a nozzle which is connected with said gas conduit and settable in various positions in relation thereto, and whereby the device for gas transport preferably is a settable device for the exhaustion or extraction of unhealthy gases from workplaces.

Ball joint mechanisms for the above purpose are known from the U.S. Pat. No. 4,540,202. In this publication there is schematically shown a ball coupling, but this is not settable and adjustable in its friction distance.

Ball joint mechanisms comprising two balls which cooperate with a spring element are known from the U.S. Pat. No. 1,827,432 and the FR-PS 699 369, but in these prior art ball joint mechanisms it is not possible to set or readjust the spring force by simple measures.

The object of the present invention has therefore been to permit, at a ball joint mechanism of the above type, setting or readjustment by hand of the spring forces.

By providing the ball joint mechanism with said characterizing features, its spring force can be set or readjusted by hand very quickly and precisely by changing the mutual position of the two members of the joint housing. By being able to carry out the change of the spring force in this way, no operations need to be done in the ball joint mechanism nor are any special tools required.

BRIEF DESCRIPTION OF THE DRAWINGS

The invention will be further described below with reference to the accompanying drawings, in which FIG. 1 with a side view illustrating an adjustable device for gas transport having a ball joint mechanism according to the invention.

DETAILED DESCRIPTION OF THE INVENTION

Figure 1:
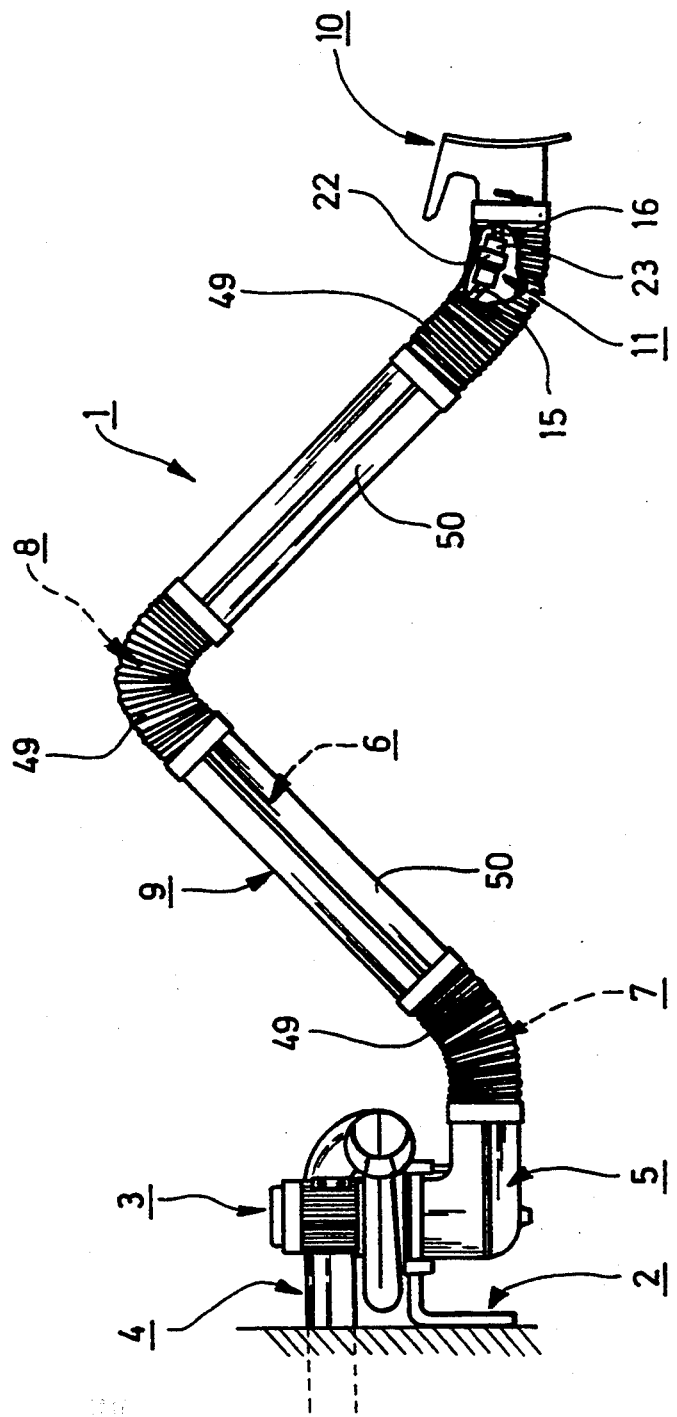
Figure 2:
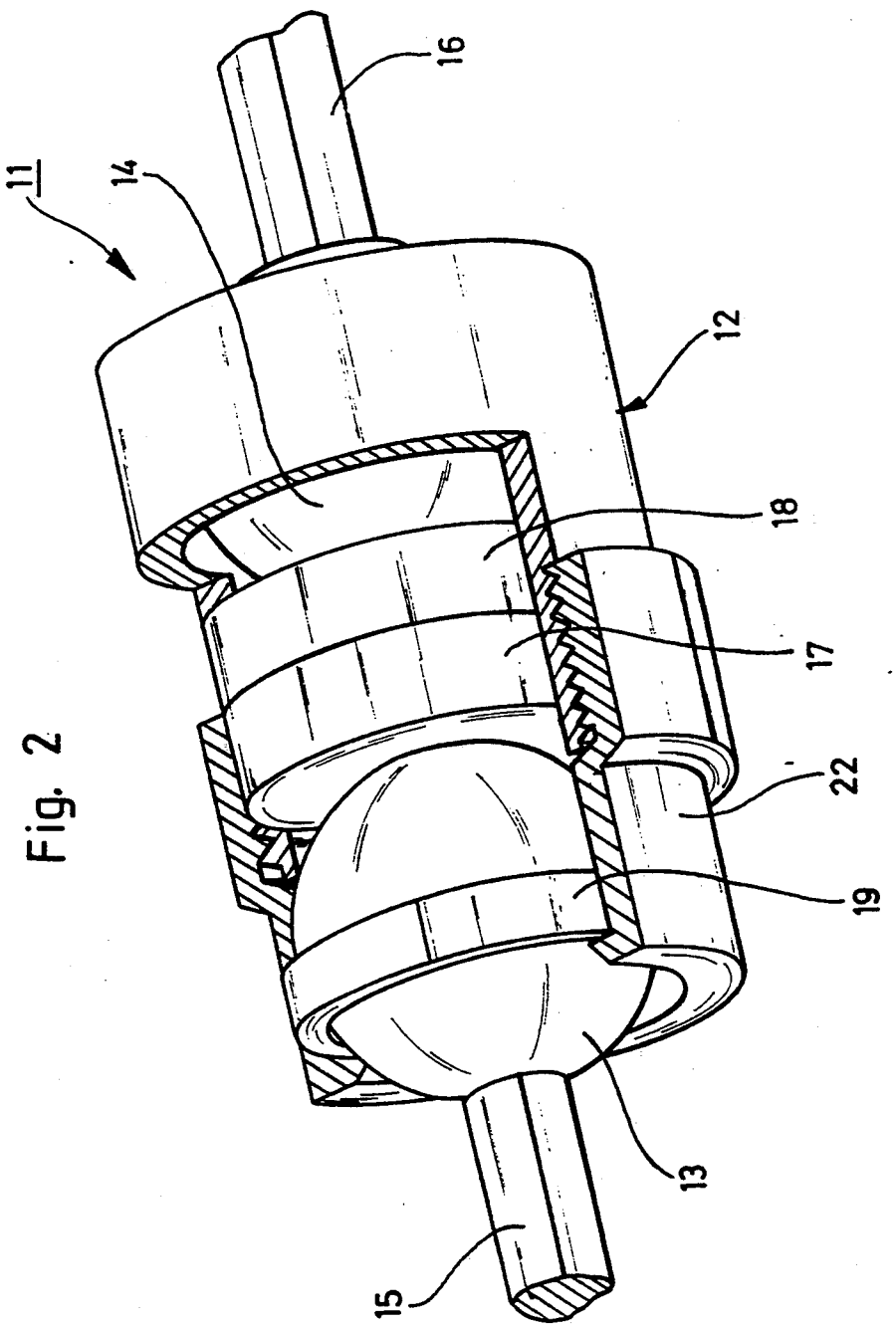
FIG. 2 is a perspective view, partly in section, of the ball joint mechanism according to the invention.
Figure 3:
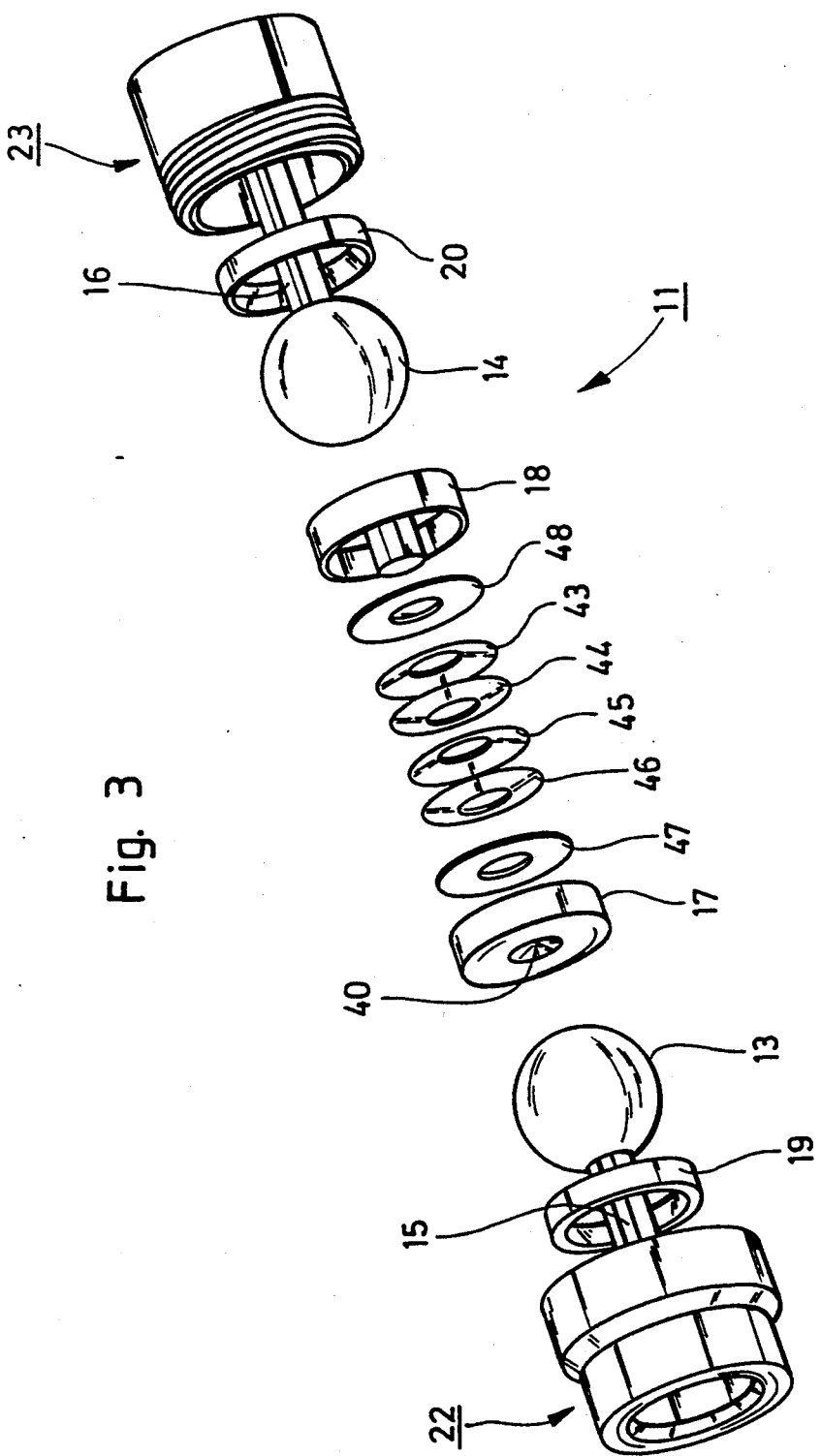
FIG. 3 is an exploded perspective view of the ball joint mechanism according to the invention.
Figure 4:
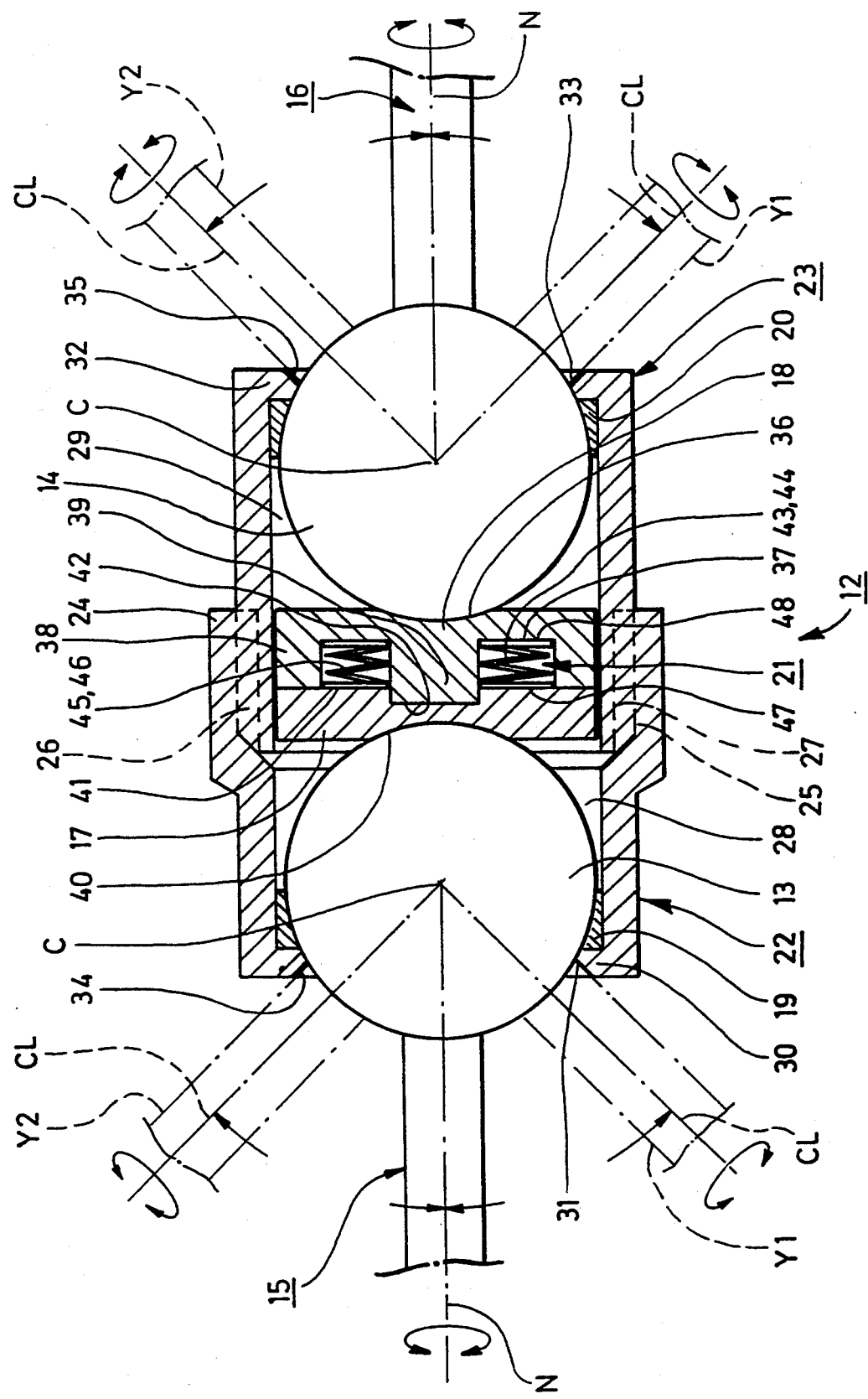
FIG. 4 is a longitudinal section of the ball joint mechanism according to the invention.

The device 1 illustrated in FIG. 1 is a settable or adjustable device for gas transport, e.g. for the exhaustion or extraction of unhealthy welding gases from welding work places. Such a device 1 is usually designated as a spot extraction device and it consists of substantially a stand 2 and a fan 3 mounted thereon, said fan 3 being connected with a passage system 4 for the discharge of extracted gases. An elbow pipe 5 is provided on the stand 2, which pipe can pivot about a vertical axis. A settable arm system 6 extends from the elbow pipe 5, said arm system having two links 7 and 8 permitting pivoting of the arms in said system about horizontal axes. The arm system 6 carries a gas conduit 9 and a nozzle 10 which is connected with said gas conduit. This nozzle 10 is connected with the arm system 6 and/or parts of the gas conduit through a link which is adapted to give extensive movability and many setting possibilities of the nozzle 10 relative to the gas conduit 9.

In order to obtain the movability of the nozzle and being able to set it in many positions, this link is designed as ball joint mechanism 11 comprising a joint housing 12 with two rotatably or pivotally mounted balls 13, 14. One of the balls 13 is through a coupling means 15 connectable with the arm system 6 and/or gas conduit 9 and the nozzle 10 is connected with the other ball 14 through a coupling means 16. Each ball 13, 14 is mounted such that it can rotate about its centre C. Furthermore, the balls 13, 14 cooperate with first friction elements 17, 18 and other friction elements 19, 20 for obtaining the required frictional resistance. Also, spring elements 21 are provided for compensating eventual wear of said friction elements 17, 18 and/or 19, 20 and/or the ball surfaces cooperating therewith.

The ball housing 12 preferably comprises two cylindrical housing members 22, 23 of which one member 22 is a female member with a widened portion 24 having internal threads 25. The other member 23 is a male member with an end portion 26 having external threads 27 and dimensioned such that it can be screwed more or less into the female member 22. Said one member 22 has a bearing space 28 for one ball 13 and said other member 23 a bearing space 29 for the other ball 14. The bearing space 28 is defined preferably at one end portion by an inwardly directed annular flange 30, defining a circular opening 31 having less diameter than the ball 13. The bearing space 29 is defined preferably at one end portion by an inwardly directed, annular flange 32, defining a circular opening 33 having less diameter than the ball 14.

The openings 31, 33 are sized or dimensioned such that a smaller portion of the balls 13, 14 protrude therethrough. Furthermore, the openings 31, 33 are dimensioned such that the balls 13, 14 can pivot from a neutral position N a limited number of degrees in all directions until the coupling means 15, 16 prevent further pivoting by engaging the joint housing 12 and preferably the flanges 30, 32 at the openings 31, 33. In connection with the openings 31, 33, the joint housing 12 preferably has obliquely outwardly directed edge portions 34, 35 such that the balls 13, 14 can pivot somewhat more outwards from their neutral position before the coupling means 15, 16 engage the joint housing 12 than if these oblique edge portions 34, 35 were lacking. Said edge portions 34, 35 can preferably extend in parallel with or substantially in parallel with extensions outwards to radii of the balls 13, 14.

Each ball 13, 14 is preferably pivotable outwards from its neutral position N about 40°-50° in all directions, preferably about 45°, before these coupling means 15, 16 engage the housing 12. At the same time, each ball is preferably rotatable about a centre line CL when it is located in its neutral position N as well as in all other setting positions, e.g. Y1 and Y2. Hereby, the ball joint mechanism 11 is capable of pivoting within a spherical sector of about ±45° per ball 13 or 14, i.e. about ±90° for both balls 13, 14. Furthermore, the ball joint mechanism 11 is capable of an unlimited rotating movement irrespective of whether it is set in neutral position N or in any other position Y1 or Y2.

The friction elements 17, 18 are provided within the balls 13, 14 in the joint housing 12, and the friction element 19 is provided in the bearing space 28 of the joint housing 12 outside the ball 13, such that outer portions of said ball 13 engage this friction element 19. Also, the friction element 20 is mounted in the bearing space 29 of the joint housing 12 outside the ball 14, such that outer portions of said ball 14 engage said friction element 20.

The friction elements 19, 20 are annular in shape and they engage preferably the inside of the respective annular flange 30, 32.

In the joint housing 12 between the balls 13, 14 there are provided two movably mounted friction elements 17, 18. One friction element 18 consists preferably of a washer, one side of which defines a friction surface 36 through which said washer is adapted to engage one ball 14. From the other side 37 of the washer there is protruding an annular outer flange 38 and a centre pin 39. The centre pin 39 is adapted to define a bearing pin for the spring element 21 and the outer flange 38 is adapted to surround said spring element. The other friction element 17 consists preferably of another washer, one side of which defines a friction surface 40 through which said friction element 17 engages the other ball 13. The other side of the friction element 17 engages the spring element 21 and preferably includes a recess 42 for the centre pin 39.

The spring element 21 preferably comprises a cup spring package including two pairs of cup springs 43–46. The cup springs in each pair are preferably located such that their outer portions engage each other. On both sides of the cup spring package there are preferably located washers 47, 48 and the cup springs 43–46 as well as said washers 47, 48 are threaded onto the centre pin 39 and held in position thereby.

After mounting the various members of the ball joint mechanism in their operative positions, the spring element 21 is prestressed by screwing the male member 25 so far into the female member 22 that the ball joint mechanism 11 gets the predetermined friction. Thus, in the completed ball joint mechanism 11, the joint housing 12 is capable of holding the balls 13, 14, friction elements 17–20 and spring element 21 in position, to protect the friction surfaces and inner parts of the joint from dirt and to apply the force giving the correct friction between the balls 13, 14 and the friction surfaces. Furthermore, the joint housing 12 has due to its partition an advantageous strength and the flow of power in tangential direction is not broken. Additionally, said construction of the joint housing 12 is aerodynamically advantageous and its construction also limits the movability of the balls 13, 14 so that no locking occurs.

The friction elements 19, 20 permit fixing of the balls 13, 14 in the joint housing 12 and they also present dirt from penetrating into said housing 12, especially if the ball joint mechanism 11 is surrounded by a tight protective cover, e.g. a rubber bellows.

The spring element 21 is provided to spring outwards e.g. for compensating eventual wear of said friction elements 17–20 and thereby preferably maintain the desired frictional force of the ball joint mechanism 11. By selecting cup springs 43–46 as spring element 21, said element gets a degressive spring constant, whereby washers 47, 48 located on opposite sides of the cup spring package prevent wear of adjacent friction elements 17, 18.

In summary, the present ball joint mechanism has a resilience of flattened or level characteristic and the friction elements allow a small "slip-stick"-effect, giving a uniform and constant frictional moment also after some wear of said friction elements. Furthermore, the embodiment of the ball joint mechanism 11 described above has the advantage of being totally independent of the direction of the load moment.

One coupling means 15 of the completed and mounted ball joint mechanism 11 is connected with the arm system 6 and/or the gas conduit 9 and the other coupling means 16 to the nozzle 10. If there is a need for changing the spring forces of the ball joint mechanism 11, this change is carried out by altering the mutual position of the members 22, 23 of the joint housing 12 until the desired spring forces are obtained. Thereafter, a flexible hose 49 is threaded onto and over the ball joint mechanism 11 and said hose is connected with the nozzle 10 and with a pipe portion 50 such that it defines a part of the gas conduit 9. If readjustment of the spring forces of the ball joint mechanism 11 is required, the hose 49 is released from the nozzle 10 or the pipe portion 50, whereafter the hose 49 is moved aside for exposure of the ball joint mechanism 11. After the readjustment, the hose 49 is reconnected such that the gas conduit 9 is reestablished.

The invention is not limited to the embodiment of the ball joint mechanism 11 according to the invention described above and shown in the drawings, but may vary within the scope of the following claims as to its construction and position. Thus, as an alternative, the joint housing 12 can have another shape and consist of another number of members which are connected with each other in other ways; the joint housing 12 can include two members which can be connected with each other by means of a bayonet mount instead of threads; the spring element 21 can be of another type, consist of another number of members and be located in other ways; the friction elements can be of another type, consist of another number of members and be located in other ways; the ball joint mechanism 11 can be mounted between other members of a gas transport device or said device can comprise a plurality of ball joint mechanisms 11; finally, the gas transport device can be of another type than for extracting welding fume or similar.

We claim:

1. A ball joint mechanism incorporated in an adjustable gas exhaustion or extraction system, comprising:
    a) a gas conduit;
    b) a nozzle connected to the gas conduit,
    c) a flexible conduit connecting the nozzle to the gas conduit,
    d) a movable ball joint mechanism positioned in the flexible conduit between the nozzle and the gas conduit for setting the nozzle in various positions relative to the gas conduit,
    e) the ball joint mechanism comprising:
        1) two pivotally mounted balls, one ball being connected to an arm carrying the gas conduit through a first coupling means, the other ball being connected to the nozzle through a second coupling means;
        2) a pair of first friction elements positioned between the two balls;
        3) a spring having at least one cup spring positioned between the first friction elements, the spring establishing a spring force on the balls;
        4) a joint housing comprising two housing members, and means for moving the housing members relative to each other, the spring force of the spring element being adjustable by changing the housing members' relative position.

f) means for releasing the flexible conduit from the gas conduit and movable for exposure of the joint housing.

2. The ball joint mechanism according to claim 1 wherein the spring member comprises a plurality of engagable cup springs.

3. The ball joint mechanism according to claim 1, wherein each ball is journalled to pivot to positions between 40° and 50° in all directions from a neutral position and to rotate in both neutral and pivoted positions.

4. The ball joint mechanism according to claim 1, wherein each ball is journalled such that it can pivot between 40°–50° in all directions from a neutral position and rotate about a centre line of the coupling means in the neutral position as well as in various pivoted positions.

5. The ball joint mechanism according to claim 1 wherein the spring element exerts spring forces, on the first friction elements and balls urging said first friction elements and balls in a direction toward each other, and said means for moving said housing members relative to each other adjusts the spring forces of the spring element for setting the frictional resistance of the ball joint mechanism.

6. The ball joint mechanism according to claim 1, wherein the housing members are connected directly to each other, whereby one ball is mounted in a bearing space in one housing member and the other ball is mounted in a bearing space in the other housing member and wherein the spring element is mounted in the joint housing between the balls, and the balls are mounted such that they transfer setting movements generated by adjusting the position of the housing members relative to each other, whereby the spring force of said spring element is set, changed and adjusted by setting and changing the position of the housing members relative to each other.

7. The ball joint mechanism according to claim 1, including means for movably mounting and pressing the spring element between the balls for exerting a spring force on the balls such that the balls engage other friction elements located in openings in the joint housing.

8. The ball joint mechanism according to claim 7, wherein the spring element is mounted in a prestressed condition between the first two friction elements provided between the balls, an inner portion of each ball engaging the first two friction elements and outer portion of each ball engaging the other friction elements, and wherein the spring element spring-loads the first friction elements between the balls in opposite directions.

9. The ball joint mechanism according to claim 8, wherein one of the first friction elements is provided between the balls comprises a washer, one side of which defines a friction surface through which the one friction element engage one ball and the other side of which the spring element is adapted to engage, and that the other of the first friction elements provided between the balls comprises a washer, one side of which defines a friction surface through which said other first friction element is adapted to engage the other ball, and the other side of which the spring element is adapted to engage.

10. The ball joint mechanism according to claim 1, wherein each housing member has a bearing space for a ball and a circular opening for the ball, which opening has a diameter less than a ball partially protruding therethrough, whereby each opening is dimensioned such that the edge portions thereof limit pivoting of the balls in an outward direction from a neutral position since the coupling means engage the edge portions, whereby the edge portions are obliquely outwardly directed and whereby each housing member for a respective ball has other friction elements which are annular in shape and are located such that outer portions of the ball engage the other friction elements.

11. The ball joint mechanism of claim 1, wherein the housing members are cylindrical, one of the housing members is a female member and the other housing member is a male member, said means for moving said housing members relative to each other includes internal threads on said female member and external threads on said male member, the male member being screwed into the female member, each housing member having an annular flange defining an opening through which a portion of a ball provided within the opening can protrude, another friction element being provided to engage each annular flange, the outer portions of the balls engaging the other friction elements and inner portions of the balls engage the first friction elements provided between said balls and the spring force of the spring element is set and eventually adjusted by screwing the female and male members of the joint housing further into and out of each other.

12. The ball joint mechanism according to claim 11, wherein the two cylindrical members when screwed together define, together with the balls and the other friction elements provided at the opening for said balls, completely closed bearing spaces for the spring element and for the first friction elements located between the balls.

* * * * *